United States Patent
Kotecha et al.

(10) Patent No.: US 9,237,370 B2
(45) Date of Patent: Jan. 12, 2016

(54) UNIFIED ELECTRONIC PROGRAM GUIDE

(71) Applicant: Verizon Patent and Licensing Inc., Basking Ridge, NJ (US)

(72) Inventors: Lalit R. Kotecha, San Ramon, CA (US); Lee K. Tjio, Danville, CA (US); William H. Stone, Doylestown, PA (US); Reza Okhravi, Walnut Creek, CA (US); Stanley A. Zadrozny, Westfield, NJ (US); Derek H. Bao, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

(21) Appl. No.: 13/735,611

(22) Filed: Jan. 7, 2013

(65) Prior Publication Data
US 2014/0196093 A1    Jul. 10, 2014

(51) Int. Cl.
*H04H 20/71*     (2008.01)
*H04N 5/445*     (2011.01)
*H04N 21/431*    (2011.01)
*H04N 21/2362*   (2011.01)
*H04N 21/414*    (2011.01)
*H04N 21/434*    (2011.01)
*H04N 21/45*     (2011.01)
*H04N 21/454*    (2011.01)
*H04N 21/482*    (2011.01)
*H04N 21/658*    (2011.01)
*H04N 21/258*    (2011.01)
*H04N 21/488*    (2011.01)
*H04N 21/81*     (2011.01)

(52) U.S. Cl.
CPC ......... *H04N 21/431* (2013.01); *H04N 21/2362* (2013.01); *H04N 21/25841* (2013.01); *H04N 21/41407* (2013.01); *H04N 21/4345* (2013.01); *H04N 21/454* (2013.01); *H04N 21/4524* (2013.01); *H04N 21/482* (2013.01); *H04N 21/6582* (2013.01); *H04N 21/25833* (2013.01); *H04N 21/488* (2013.01); *H04N 21/8133* (2013.01)

(58) Field of Classification Search
CPC ............................. H04N 5/445; H04H 20/71
USPC ...................................... 725/54, 48
See application file for complete search history.

(56) References Cited

U.S. PATENT DOCUMENTS

2006/0126556 A1*  6/2006  Jiang ...................... H04L 12/18
                                                    370/328
2010/0080163 A1*  4/2010  Krishnamoorthi .... H04L 12/189
                                                    370/312

* cited by examiner

*Primary Examiner* — Hunter B Lonsberry
*Assistant Examiner* — Tung T Trinh (57) ABSTRACT

A device may receive a request for an electronic program guide from a user device and determine a location of the user device. The device may determine, based on the determining that the user device is located in a first location, a group of different types of networks available to the user device and may provide, based on the determined group of different types of networks available to the user device, the electronic program guide for display. The electronic program guide may include a network identifier for each of one or more available channels associated with each of the determined group of different types of networks, and a content identifier associated with a respective one of the one or more available channels associated with each of the determined group of different types of networks.

20 Claims, 9 Drawing Sheets

UNIFIED ELECTRONIC PROGRAM GUIDE

BACKGROUND

Mobile devices, such as smart phones, may include logic to connect to networks through multiple different interfaces. For instance, a mobile device may include circuits to connect to a network through an IEEE 802.11 (WiFi) access network, a Third Generation (3G) cellular access network, and/or a Fourth Generation (4G) cellular access network.

DETAILED DESCRIPTION OF PREFERRED EMBODIMENTS

The following detailed description refers to the accompanying drawings. The same reference numbers in different drawings may identify the same or similar elements.

A system and/or method, as described herein, may relate to providing an electronic program guide, including channel and content information associated with different types of access networks, to a user device. Based on a location of the user device, different electronic program guides may be provided based on the network(s) available to the user device in each location.

While the following description focuses on a Long Term Evolution (LTE) standard and an IEEE 802.11 (WiFi) access network, it will be appreciated that systems and/or methods, described herein, are equally applicable to other wireless standards.

Figure 1:
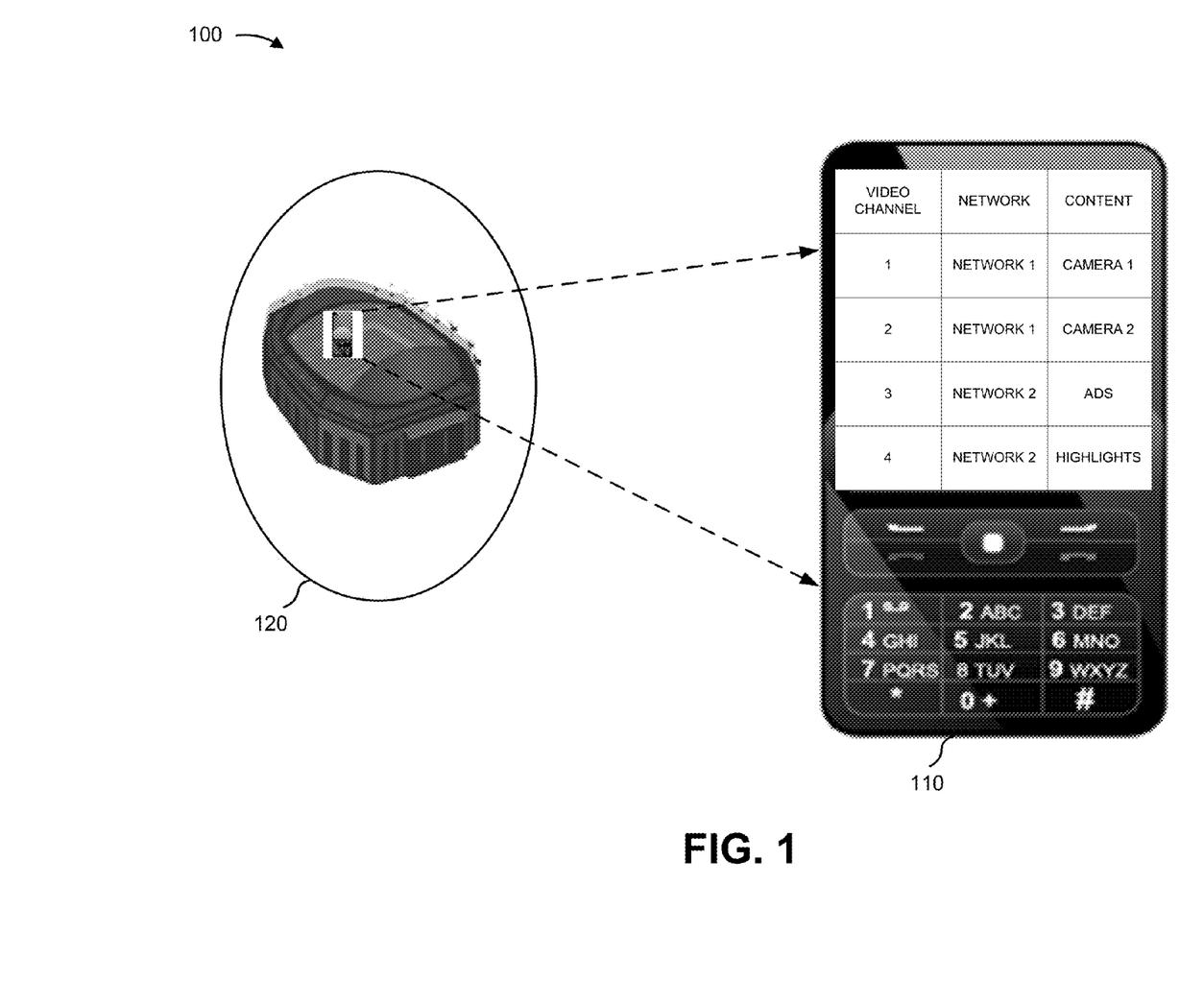
FIG. 1 depicts an overview of an example implementation described herein.

FIG. 1 is a diagram illustrating an overview 100 of an example implementation described herein. With reference to FIG. 1, assume a user of user device 110 is located at a venue 120 (e.g., a football stadium). While at the football stadium, the user may use user device 110 to receive and display video. Based on the location of user device 110, different video channels may be available for the user to select.

At some time after user device 110 enters the stadium, user device 110 may display information regarding the available video channels associated with the football stadium. User device 110 may display this information upon detection of a particular location associated with user device 110 (e.g., user device 110 is currently located inside the football stadium), based on a request from the user to receive this information (e.g., selecting an application associated with providing available video channels), or in some other manner.

As illustrated in FIG. 1, user device 110 may display a list of video channels (e.g., channel 1, channel 2, etc.), a list of available networks (e.g., network 1 and network 2), and a corresponding description of the video content that is associated with each video channel (e.g., content 1, content 2, etc.). After reviewing the video channels, available networks, and corresponding video content, the user may select a particular video channel. Based on the selection, user device 110 may provide, for display, the video content associated with the selected video channel.

For example, if the user of user device 110 selects video channel 1, user device 110 may provide, for display, video content associated with camera 1 using network 1. In addition, if the user of user device 110 selects video channel 3, user device 110 may provide, for display, advertisements associated with a football team that is currently playing a game in the football stadium using network 2. Similarly, if the user of user device 110 selects video content 4, user device 110 may provide, for display, highlights of the football team that is currently playing in the football stadium (e.g., associated with the current game, associated with a current season, etc.) using network 2.

Figure 2:
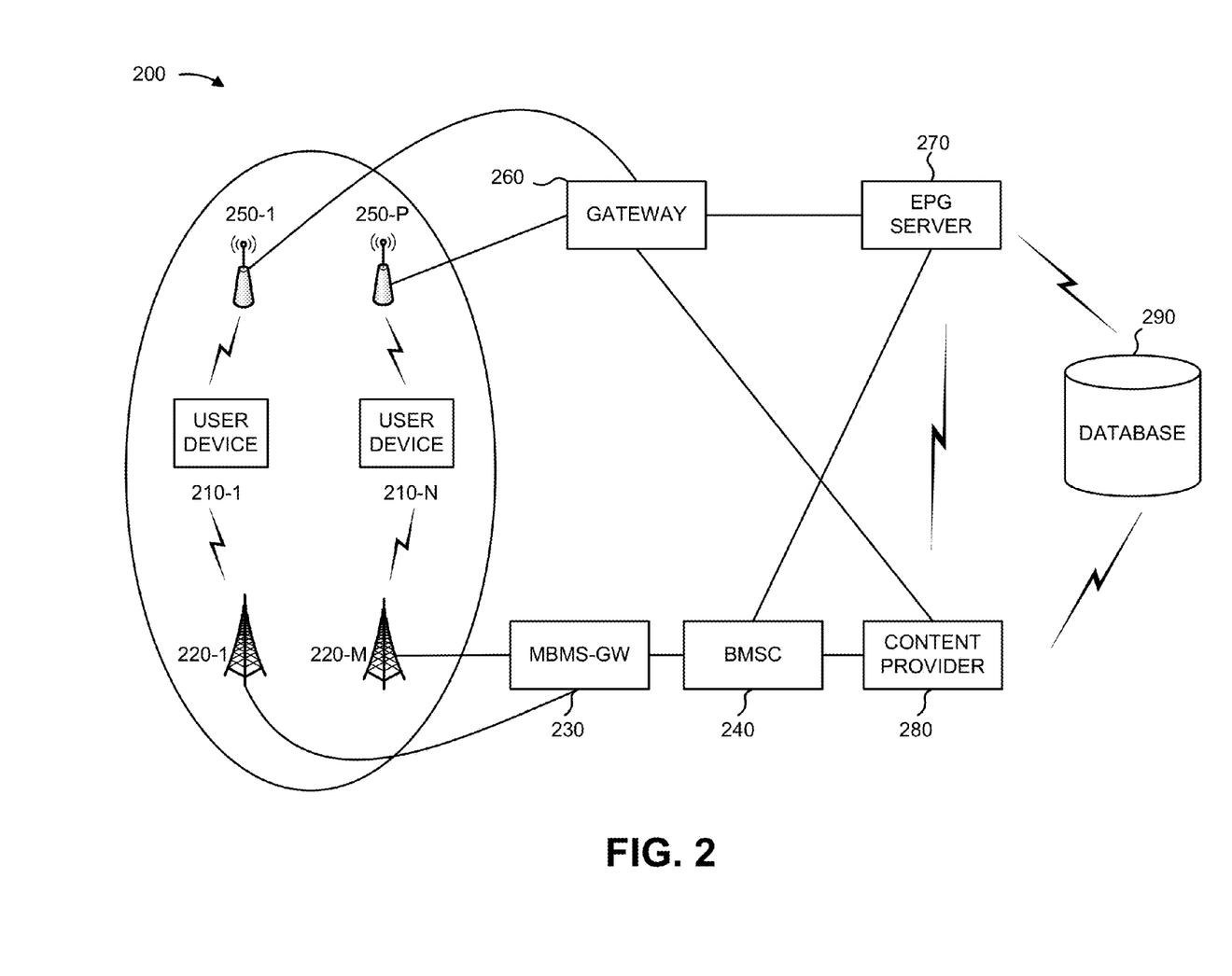
FIG. 2 is a diagram of an example environment in which systems and/or methods described herein may be implemented.

FIG. 2 is a diagram of an example environment 200 in which systems and/or methods described herein may be implemented. As illustrated, environment 200 may include a group of user devices 210-1 through 210-N (where N>1) (which may be referred to collectively and individually as "user device 210"), a group of eNodeBs 220-1 through 220-M (where M>1) (which may be referred to collectively and individually as "eNodeB 220"), a Multimedia Broadcast/Multicast Service Gateway (MBMS-GW) 230, a Broadcast/Multicast Services Center (BMSC) 240, a group of WiFi access points 250-1 through 250-P (where P>1) (which may be referred to collectively and individually as "WiFi access point 250"), a WiFi gateway 260, an electronic program guide ("EPG") server 270, a content provider 280, and a database 290. Components of environment 200 may interconnect via wired and/or wireless connections. For example, user device 210 may wirelessly connect to one or more eNodeBs 220 and/or one or more WiFi access point 250. MBMS-GW 230, BMSC 240, WiFi gateway 260, EPG server 270, content provider 280, and database 290 may interconnect via wired and/or wireless connections.

User device 210 may include a device, such as a wireless mobile communication device, that is capable of communicating with eNode B 220 and/or WiFi access point 250. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, or another type of mobile computation or communication device.

eNodeB 220 may include one or more wireless transmission devices that provide unicast and broadcast services to user device 210. For example, eNodeB 220 may include one or more devices that wirelessly receive information (e.g., video, voice, data, etc.) from user device 210 and transmit that information to other components in environment 200, including EPG server 270. eNodeB 220 may also include one or more devices that receive content (e.g., video content) from content provider 280 and wirelessly transmit that content to user device 210 as part of a broadcast service. eNodeB 220 may further include one or more devices that provide an EPG to user device 210 as part of a broadcast service. Moreover, eNodeB 220 may periodically provide updates to user device 210 to reflect the latest available programming. In one example, eNodeB 220 may push the EPG to user device 210 (e.g., in a one-way communication). In another example, eNodeB 220 may provide two-way broadcast communication that allows information, from user device 210, to be collected. eNodeB 220 may additionally include one or more devices that forward information, received from user device 210, to EPG server 270, to allow EPG server 270 to make decisions regarding the content of the EPG that is to be provided to user device 210.

MBMS-GW 230 may include one or more devices that gather, process, and/or provide information in a manner described herein. For example, MBMS-GW 230 may include a router, a bridge, a gateway, or another type of network device. In an example implementation, MBMS-GW 230 may include a point-to-multipoint interface that provides delivery of broadcast services to one or more eNodeBs 220.

BMSC 240 may include one or more devices that gather, process, and/or provide information in a manner described herein. For example, BMSC 240 may include a router, a bridge, a gateway, or another type of network device. In an example implementation, BMSC 240 may obtain, from EPG server 270, information identifying content to be broadcast and cause the content to be provided, from content provider 280, to MBMS-GW 230.

Access point 250 may include one or more devices, associated with a WiFi network, that may receive, process, and/or transmit traffic, such as voice, video, text, and/or other data, destined for and/or received from user device 210. Access point 250 may also receive traffic from and/or send traffic to WiFi gateway 260.

WiFi gateway 260 may include one or more devices that gather, process, and/or provide information in a manner described herein. For example, WiFi gateway 260 may include a router, a bridge, a gateway, or another type of network device. In an example implementation, WiFi gateway 260 may include a point-to-multipoint interface that provides delivery of broadcast services to one or more access points 250.

EPG server 270 may include one or more devices that gather, process, and/or provide information in a manner described herein. For example, EPG server 270 may include a server device or another type of network device. In an example implementation, EPG server 270 may receive radio resource availability information from eNodeB 220 and make decisions regarding the EPG based on the received radio resource availability information. EPG server 270 may also receive information from content provider 280, database 290, and/or another device and use that information to create the EPG.

Content provider 280 may include one or more devices that gather, process, and/or provide information in a manner described herein. In one example, content provider 280 may include a computer system, an application, and/or a broadcasting device capable of providing video content. Content provider 280 may provide video content from a satellite feed, a cable television feed, an Internet content store, and/or from another source.

Database 290 may include one or more devices that store information used by EPG server 270 to perform operations described herein. Database 290 may, for example, store information associated with the EPG including, for example, network information, channel information, and video content information. Database 290 may also receive requests for the information associated with the EPG from EPG server 270 and may receive information regarding the video content from content provider 280.

Although FIG. 2 shows example components of environment 200, in some implementations, environment 200 may include fewer components, different components, differently arranged components, or additional components than those depicted in FIG. 2. Additionally, or alternatively, one or more components of environment 200 may perform one or more tasks described as being performed by one or more other components of environment 200.

Figure 3:
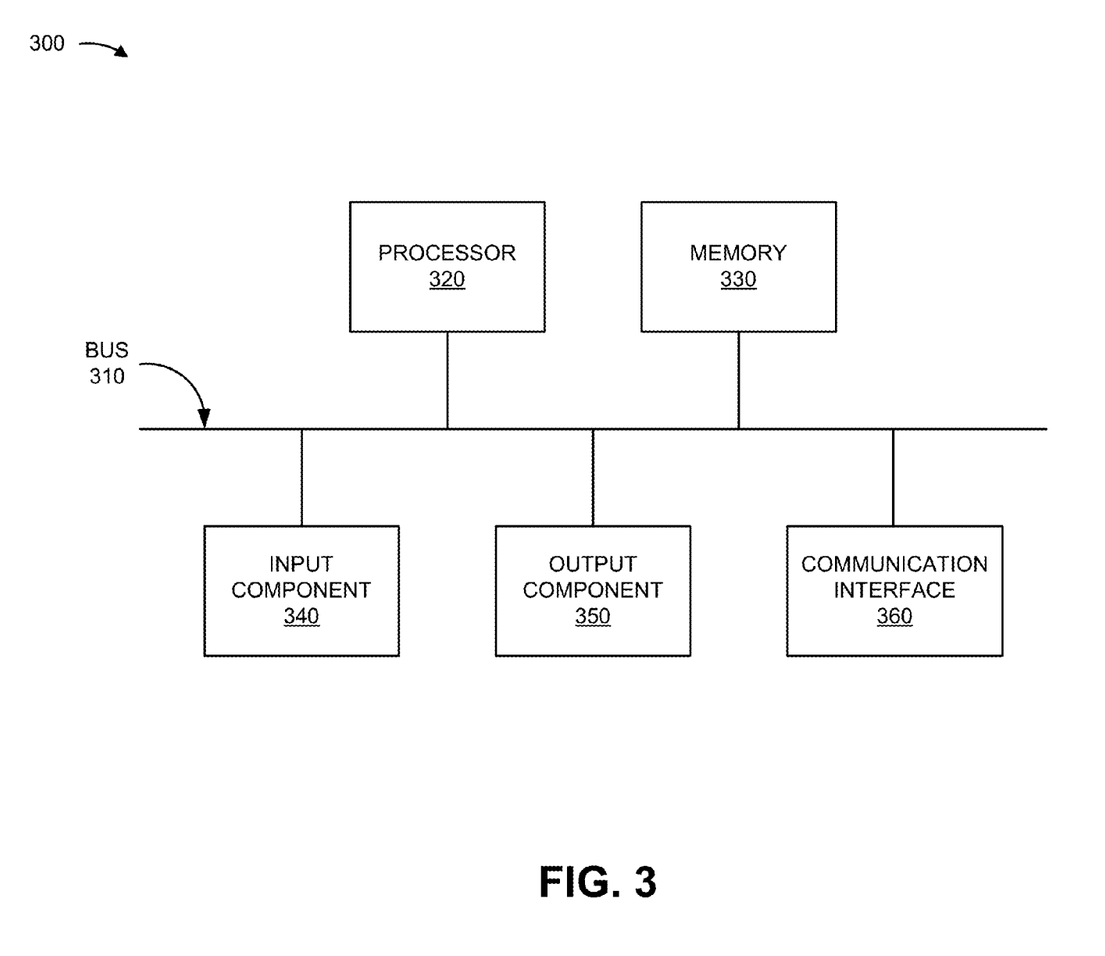
FIG. 3 depicts a diagram of example components of one or more devices of FIG. 2.

FIG. 3 is a diagram of example components of a device 300. Device 300 may correspond to user device 210, EPG server 270, and/or content provider 280. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210 and/or server device 220 may include one or more devices 300 and/or one or more components of device 300.

Figure 4:
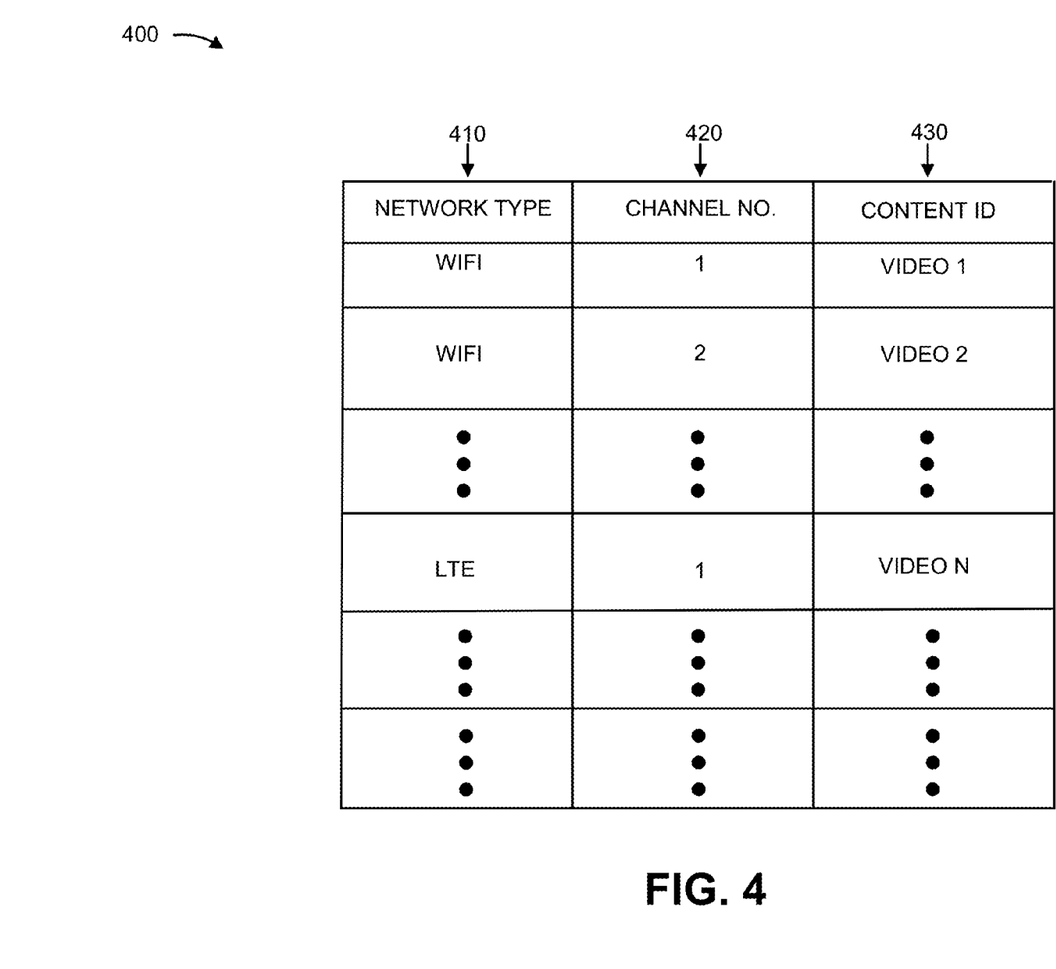
FIG. 4 depicts an example data structure.

FIG. 4 illustrates an example data structure 400 that may be stored by database 290 and/or one or more devices, such as user device 210, EPG server 270, and/or content provider 280.

As shown in FIG. 4, data structure 400 may include a network type field 410, a channel number field 420, and a content identifier (ID) field 430.

Network type field 410 may store information identifying a type of network that user device 210 may access to receive video content. As illustrated in FIG. 4, network type field 410 may store information regarding a WiFi network and an LTE network. In some implementations, network type field 410 may store information identifying additional and/or different types of networks.

Channel number field 420 may store information identifying one or more channel numbers associated with each of the network types in network type field 410. As illustrated in FIG. 4, channel number field 420 may store information indicating two channels that are associated with the WiFi network and one channel that is associated with the LTE network. Information identifying additional channels for the WiFi network and/or the LTE network may also be included in channel number field 420.

Content identifier field 430 may store information identifying content that is associated with the channel of the respective network(s) identified by fields 410 and 420. The information may include a name of the content, a link to the content, and/or other information relating to the content. Examples of content may include video content associated with a venue (e.g., a football stadium), video content associated with a cable network provider, advertisements, information associated with the venue, etc.

While data structure 400 is shown to include a particular quantity and arrangement of fields, the fields shown in FIG. 4 are for explanatory purposes only. In practice, data structure 400 may include additional fields, fewer fields, different fields, or differently arranged fields than are described with respect to data structure 400.

Figure 5:
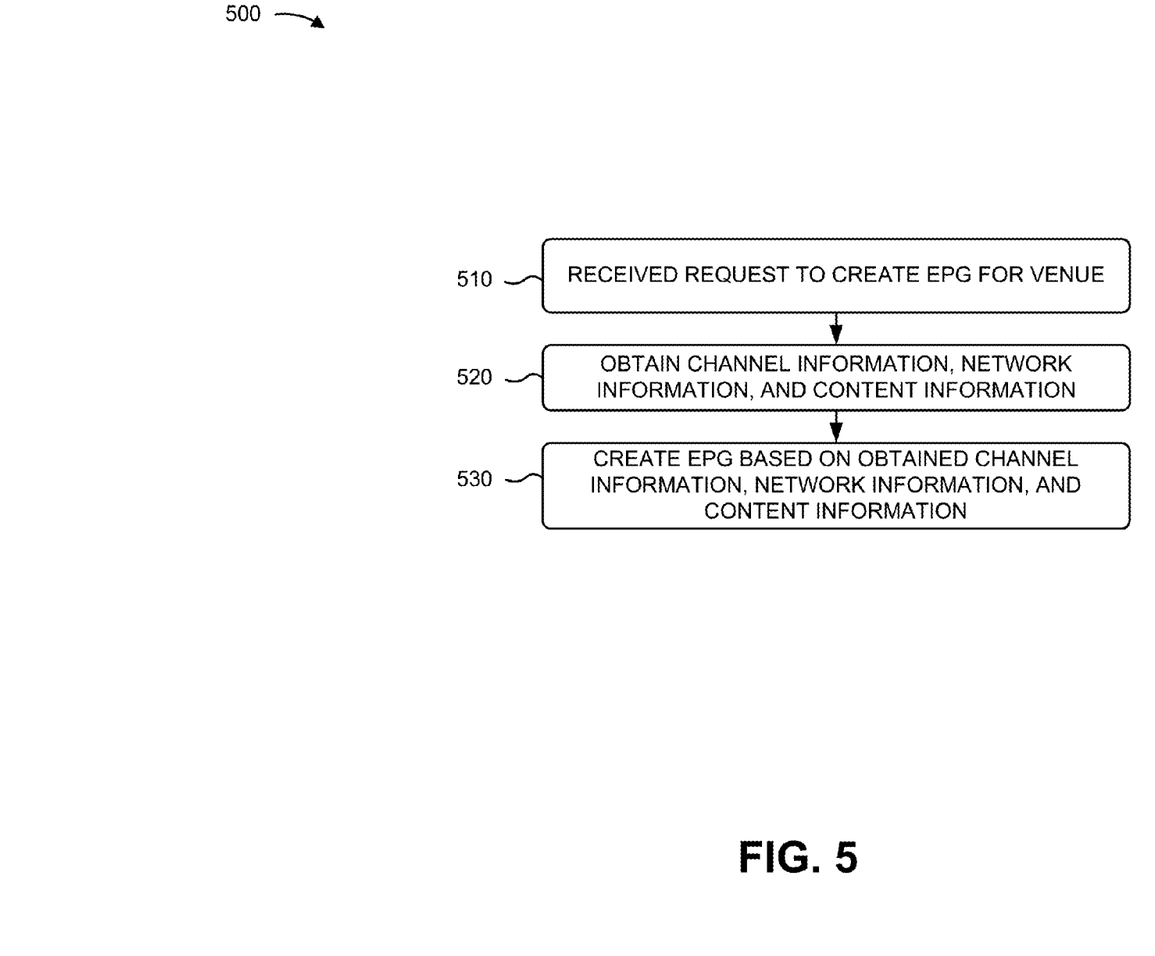
FIGS. 5 and 6 depict flow charts of example processes according to implementations described herein.

FIG. 5 is a flow chart of an example process 500 for creating an EPG. In some implementations, one or more process blocks of FIG. 5 may be performed by EPG server 270. Additionally, or alternatively, one or more process blocks of FIG. 5 may be performed by another device or a group of devices separate from or including EPG server 270, such as content provider 280.

Process 500 may include receiving a request to create an EPG for a venue (block 510). For example, a venue administrator associated with the venue (e.g., a football stadium) may transmit a request, to EPG server 270, to create an EPG for a particular event (e.g., an upcoming football game at the football stadium). In some implementations, EPG server 270 may receive a request to create an EPG for multiple venues from one or more venue administrators associated with each of the multiple venues.

Process 500 may include obtaining channel information, network information, and content information associated with each channel of the EPG (block 520). For example, EPG server 270 may receive, from the venue administrator(s) and for each channel, information regarding a channel, information identifying the network on which the channel is available, and information regarding content that is to be provided via the channel. In some implementations, EPG server 270 may receive the information regarding the channels, the networks on which the channels are available, and the content for each channel from another source, such as, for example, content provider 280.

Process 500 may include creating the EPG based on the obtained channel information, network information, and content information associated with each channel of the EPG (block 530). For example, EPG server 270 may create the EPG that includes information regarding one or more network types, one or more channel numbers associated with each network type, and/or content identifiers associated with each of the one or more channel numbers. In some implementations, if EPG server 270 receives requests to create a respective EPG for multiple venues, EPG server 270 may associate an identifier with each EPG. In some implementations, EPG server 270 may store information regarding the EPG and the identifier in EPG server 270. In some implementations, EPG server 270 may store the information regarding the EPG and the identifier in one or more other locations including, for example, database 290.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6:
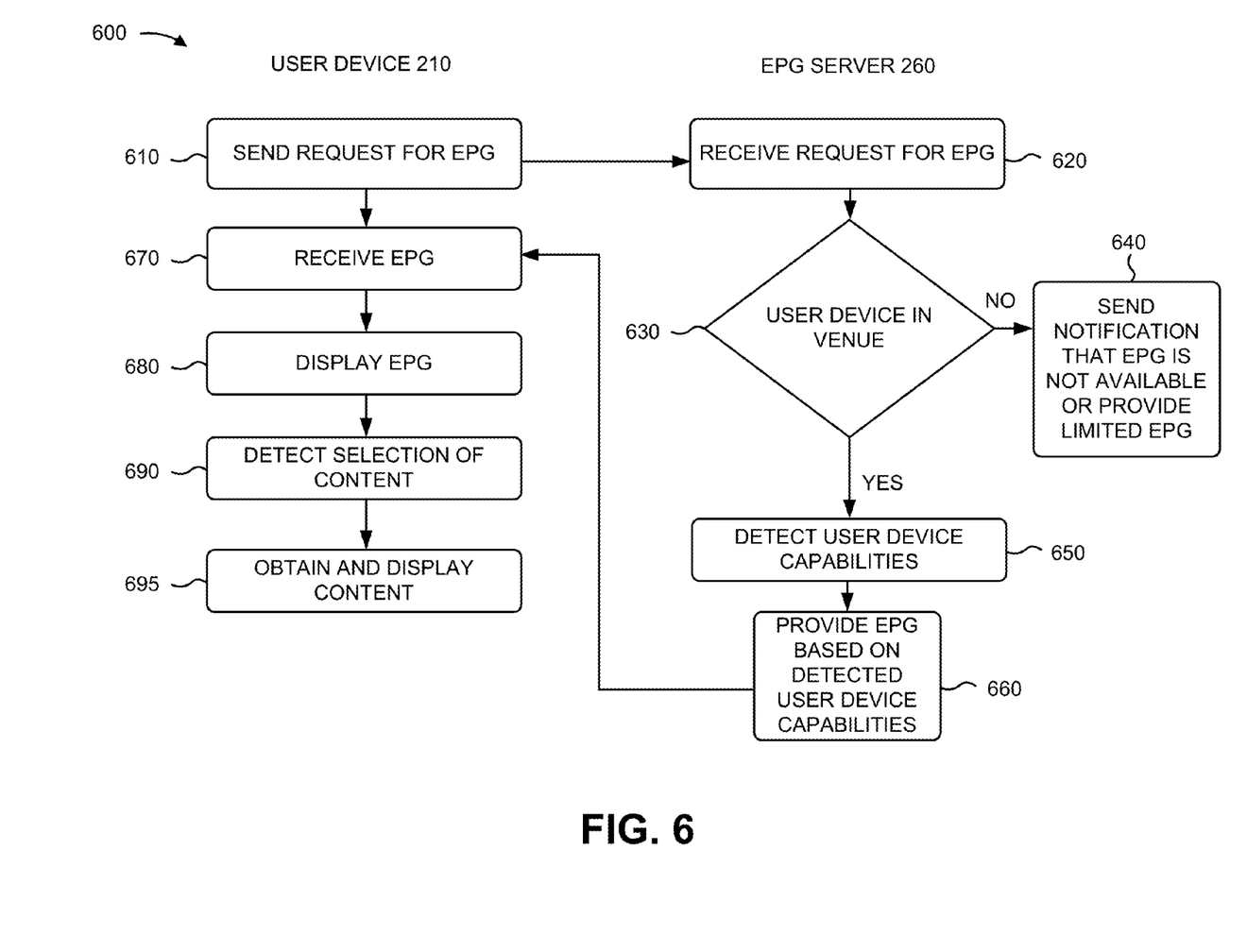

FIG. 6 is a flow chart of an example process 600 for creating an EPG. In some implementations, one or more process blocks of FIG. 6 may be performed by user device 210 and one or more process blocks of FIG. 6 may be performed by EPG server 270. Additionally, or alternatively, one or more process blocks of FIG. 6 may be performed by one or more other devices.

Process 600 may include sending a request for an EPG (block 610). For example, user device 210 may send the request for the EPG to EPG server 270. For example, when user device 210 is brought within the confines of a venue for which an EPG is to be provided, user device 210 may determine location information associated with user device 210 and automatically transmit the request to EPG server 270 based on the location information. In some implementations, a user of user device 210 may enter information to send the request by, for example, activating an application on user device 210, accessing a website via user device 210, etc. In some implementations, user device 210 may send the request for the EPG in one or more other ways.

Process 600 may include receiving the request for the EPG (block 620). For example, EPG server 270 may receive the request from user device 210. EPG server 270 may, in addition to receiving the request, receive other information associated with user device 210. For example, EPG server 270 may receive an identifier associated with user device 210, location information associated with user device 210, and/or capability information associated with user device 210.

Process 600 may include determining if user device 210 is located in the venue (block 630). For example, EPG server 270 may, based on the received location information associated with user device 210, determine a location of user device 210. If user device 210 is not located in the venue (block 630—NO), EPG server 270 may send a notification to user device 210 that some or all of the requested EPG is not available (block 640). For example, if user device 210 is located outside the venue (e.g., in the parking lot), EPG server 270 may determine that content associated with one or more networks should not be made available to user device 210. In some implementations, content associated with the WiFi network may not be made available to user device 210 when user device 210 is located in the parking lot. In some implementations, content associated with one or more other networks (e.g., the LTE network) may be made available to user device 210 when user device 210 is located in the parking lot.

Based on determining that user device 210 is located in the venue (block 630—YES), process 600 may include detecting one or more capabilities associated with user device 210 (block 650). Based on the received identifier and/or capability information associated with user device 210, EPG server 270 may determine the network(s) (e.g., the WiFi network, LTE network, etc.) available to user device 210.

Process 600 may include providing the EPG based on the capability information associated with user device 210 (block 660). For example, EPG server 270 may determine that user device 210 may connect to, and receive content from, the WiFi network and LTE network. Therefore, EPG server may provide the EPG that lists the WiFi network and LTE network (and the corresponding channel(s) and available content) to user device 210. In some implementations, EPG server 270 may determine that user device 210 may connect to, and receive content from, the WiFi network and that user device 210 is not capable of receiving content from the LTE network. Based on this determination, EPG server 270 may provide the EPG that only lists the WiFi network (and the corresponding channel(s) and available content) to user device 210.

In some implementations, in addition to providing the EPG based on the capability information associated with user device 210, EPG server 270 may provide different available channels for the EPG based on the location of user device 210 within the venue. For example, if user device 210 is located on a ramp or outside the seating area of the venue, the EPG may have one or more different available channels associated with the WiFi network than if user device 210 is located in a luxury box seat or suite of the venue.

Process 600 may include receiving the EPG (block 670). For example, user device 210 may receive the EPG from EPG server 270. Process 600 may also include displaying the EPG (block 680). For example, user device 210 may display the EPG on a screen of user device 210. In some implementations, user device 210 may provide the EPG audibly to the user.

Process 600 may include detecting a selection of content associated with the EPG (block 690). For example, a user of user device 210 may review the list of available channel(s) and associated content and may select a channel to receive the associated content. In some implementations, the user may indicate a selection by touching or clicking the desired channel. In some implementations, the user may indicate the selection in one or more other manners. For example, the user of user device 210 may select the content identifier associated with the desired channel. Based on the selected content identifier, user device 210 and/or EPG server 270 may determine the corresponding channel.

Process 600 may include obtaining and displaying the content (block 695). For example, user device 210 may tune to the selected channel. In some implementations, user device 210 may, based on the user selection, transmit a request to a device (e.g., EPG server 270, content server 280, or another device) to receive the content associated with the selected channel.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
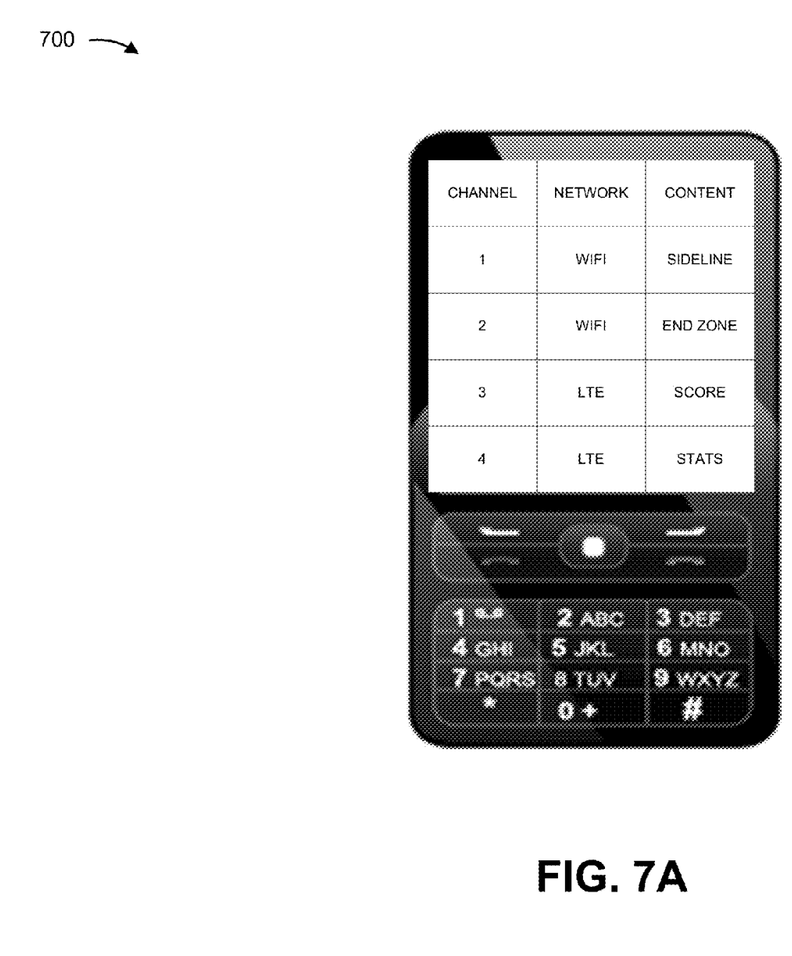
FIGS. 7A-7C are diagrams of example implementations relating to the example process shown in FIG. 6.
Figure 7B:
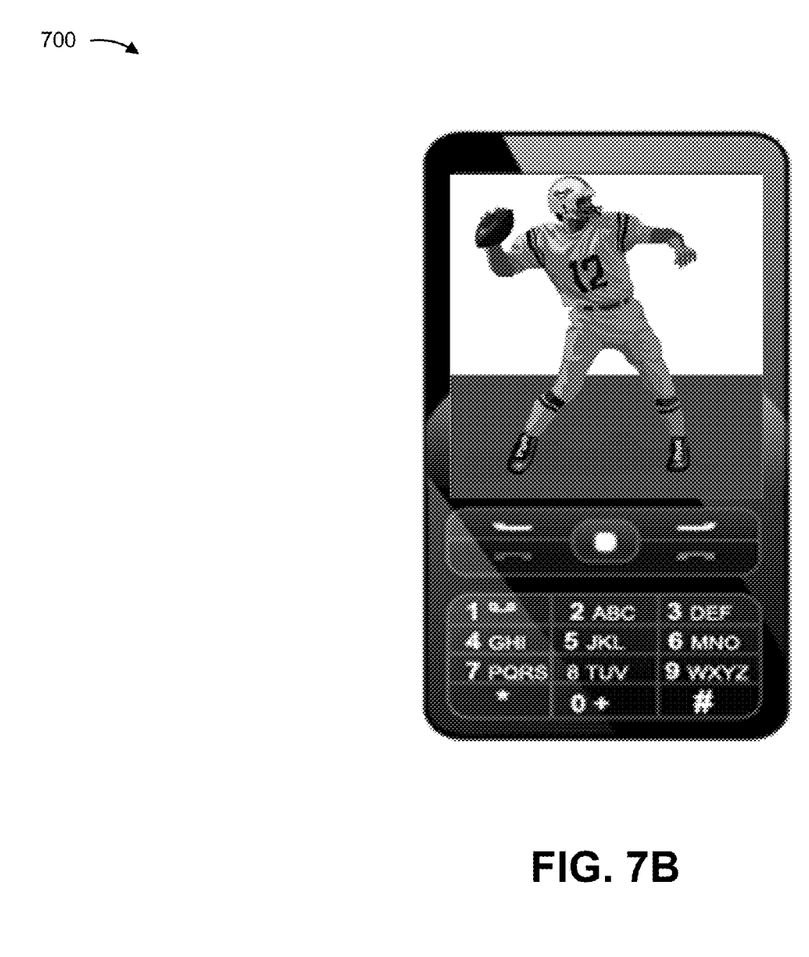
Figure 7C:
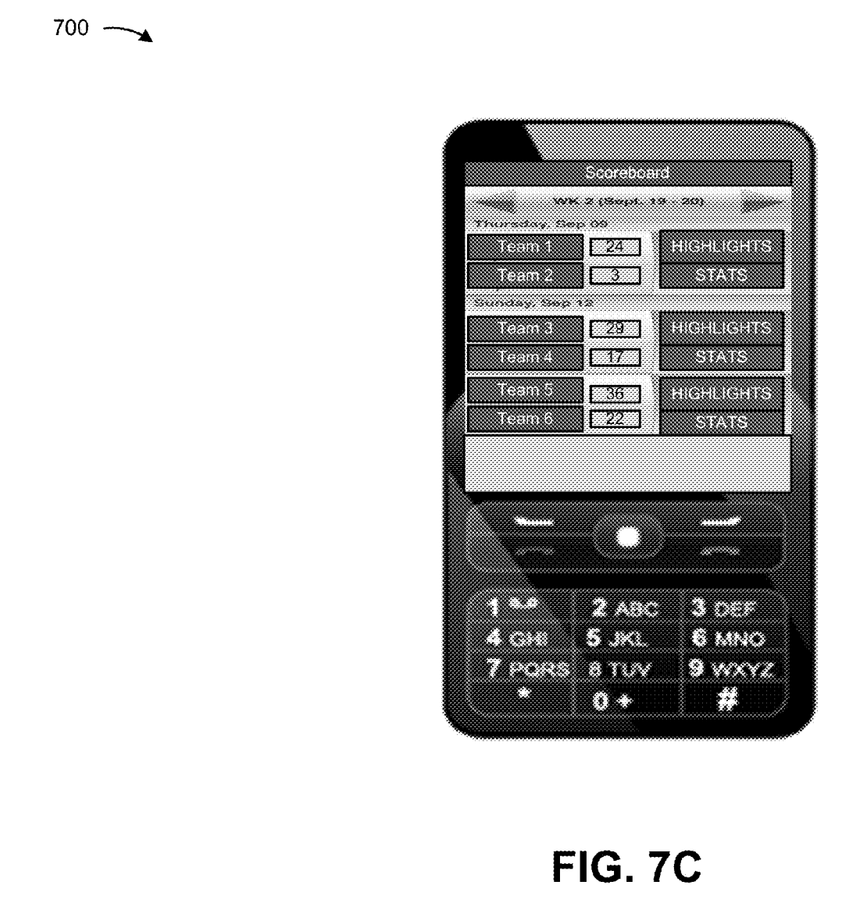

FIGS. 7A-7C depict an example 700 of process 600 described above with respect to FIG. 6. Assume, for example 700, that a user of user device 210 is located within a football stadium. In response to user device 210 transmitting a request for the EPG to EPG server 270, EPG server 270 may determine that user device 210 is located within the football stadium and that user device 210 is capable of receiving content using the WiFi network and the LTE network. Based on this determination, EPG server 270 may transmit, to database 290, a request for the EPG associated with the football stadium.

Database 290 may access data structure 400 that is associated with the football stadium and may provide the information included in data structure 400 to EPG server 270 and EPG server 270 may generate the EPG based on the information. After EPG server 270 transmits this information to user device 210, user device 210 may display this information on the screen.

As illustrated in FIG. 7A, this information may include four channels (e.g., channel 1, channel 2, etc.) and the network type (e.g., WiFi and LTE) and content associated with each channel. Because user device 210 is located inside the football stadium, user device 210 may receive network and content information associated with both the WiFi network and the LTE network. In addition, the content associated with the WiFi network may include video content from one or more camera views within the stadium, and the content associated with the LTE network may include score information associated with the football game currently being played in the football stadium, score information associated with one or more other games, and/or statistics associated with the football game currently being played in the football stadium and/or one or more other games.

Assume that the user of user device 210 selects, while user device 210 is located within the football stadium, channel 1. Based on this selection, user device 210 may connect to the WiFi network (if user device 210 is not already connected to that network) and tune to channel 1 to begin viewing feed from the sideline view camera, as illustrated in FIG. 7B.

As another example, assume that the user of user device 210 selects channel 3. Based on this selection, user device 210 may connect to the LTE network (if user device 210 is not already connected to that network) and tune to channel 3 to begin receiving, using the LTE network, a live feed of scores, of one or more games, as illustrated in FIG. 7C. In some implementations, user device 210 may display score information, statistics, and highlights associated with the one or more games, as further illustrated in FIG. 7C.

Implementations described herein may provide a user with a guide that displays available channels of content associated with different types of networks that the user's device may access. By providing the available channels in a single guide, the user may easily browse the available content and view the content by accessing the different types of networks.

The foregoing description provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
generating, by a processor of a server, a single electronic program guide;
receiving, by the processor, a request for the single electronic program guide,
the request for the single electronic program guide being received from a user device,
the user device being different than the server;
determining, by the processor and at a first time, a first location of the user device,
the first location being associated with a first particular area within a single venue;
determining, by the processor and based on the determining that the user device is located in the first location, that a first network is available to the user device and that a second network is available to the user device;
receiving, by the processor, capability information associated with the user device;
determining, by the processor and based on determining that the first network is available and that the second network is available and using the capability information, that the first network and the second network are accessible by the user device;
providing, by the processor and based on determining that the first network and the second network are accessible by the user device, the single electronic program guide for display,
the single electronic program guide including:
a first network identifier for each of one or more first available channels associated with the first network,
a first set of content identifiers associated with the one or more first available channels associated with the first network,
a second network identifier for each of one or more second available channels associated with the second network, and
a second set of content identifiers associated with the one or more second available channels associated with the second network;
determining, by the processor and at a second time, a second location of the user device,
the second time being different than the first time, and the second location being:
different than the first location, and
associated with a second particular area within the single venue,
the second particular area being different than the first particular area;
determining, by the processor and based on the determining the second location of the user device, that a third network is available to the user device and that a fourth network is not available to the user device;
providing, by the processor and based on determining that the fourth network is not available to the user device, a notification that one or more available channels, associated with the fourth network, are not viewable by the user device;
determining, by the processor and based on determining that the third network is available and using the capability information, that the third network is accessible by the user device; and
providing, by the processor and based on the determining that the third network is accessible by the user device, another electronic program guide for display,
the other electronic program guide being different than the single electronic program guide, and
the other electronic program guide including:
a third network identifier for each of one or more third available channels associated with the third network, and
a third set of content identifiers associated with the one or more third available channels associated with the third network.

2. The method of claim 1, further comprising:
determining that the user device is located at a third location,
the third location being different than the first location;
determining that at least one first channel, of the one or more first available channels, is not available at the third location;
modifying, based on determining that the at least one first channel, of the one or more first available channels, is not available at the third location, the single electronic program guide to remove information regarding the at least one first channel; and
providing, for display, the modified electronic program guide.

3. The method of claim 1, further comprising:
determining that the user device is located at a third location,
the third location being different than the first location;
determining that at least one additional channel, associated with one of the first network or the second network, is available at the third location;
modifying, based on determining that the at least one additional channel, associated with the one of the first network or the second network, is available, the single electronic program guide to add information regarding the at least one additional channel; and
providing, for display, the modified electronic program guide.

4. The method of claim 1, further comprising:
determining that the user device is located at a third location,
the third location being different than the first location;
determining that at least one of the first network or the second network is not available at the third location;
modifying, based on determining that the at least one of the first network or the second network is not available at the third location, the single electronic program guide,
where, when modifying the single electronic program guide, the method further includes:
removing at least one of the first network identifier or the second network identifier; and
removing at least one of the first set of content identifiers or the second set of content identifiers; and
providing, for display, the modified electronic program guide.

5. The method of claim 1, where the first network and the second network include a cellular network and a wireless, non-cellular network.

6. The method of claim 1, further comprising:
receiving a request to create the single electronic program guide;
obtaining channel information associated with the one or more first available channels and the one or more second available channels, network information associated with each of the first network and the second network, and content information associated with the one or more first available channels and the one or more second available channels; and
creating, based on obtaining the channel information, the network information, and the content information, the single electronic program guide.

7. The method of claim 6, where, when obtaining the channel information and the content information, the method comprises:
obtaining channel information and content information for each of a plurality of venues, and
where, when creating the single electronic program guide, the method further comprises:
creating a respective single electronic program guide for each of the plurality of venues.

8. A device comprising:
a processor to:
generate a single electronic program guide;
receive a request for the single electronic program guide,
the request for the single electronic program guide being received from a user device,
the user device being different than the device;
determine, at a first time, a first location of the user device,
the first location being associated with a first particular area within a single venue;
determine, based on the determining that the user device is located in the first location, that a first network is available to the user device and that a second network is available to the user device;
receive capability information associated with the user device;
determine, based on determining that the first network is available and that the second network is available and using the capability information, that the first network and the second network are accessible by the user device;
provide, based on determining that the first network and the second network are accessible by the user device, the single electronic program guide for display, the single electronic program guide including:
a first network identifier for each of one or more first available channels associated with the first network,
a first set of content identifiers associated with the one or more first available channels associated with the second network,
a second network identifier for each of one or more second available channels associated with the second network, and
a second set of content identifiers associated with the one or more second available channels associated with the second network;
determine, at a second time, a second location of the user device,
the second time being different than the first time, and the second location being:
different than the first location, and
associated with a second particular area within the single venue,
the second particular area being different than the first particular area;
determine, based on the determining the second location of the user device, that a third network is available to the user device and that a fourth network is not available to the user device;
provide, based on determining that the fourth network is not available to the user device, a notification that one or more available channels, associated with the fourth network, are not viewable by the user device;
determine, based on determining that the third network is available and using the capability information, that the third network is accessible by the user device; and
provide, based on the determining that the third network is accessible by the user device, another electronic program guide for display,
the other electronic program guide being different than the single electronic program guide, and
the other electronic program guide including:
a third network identifier for each of one or more third available channels associated with the third network,
the one or more third available channels being different than the one or more first available channels, and
a third set of content identifiers associated with the one or more third available channels associated with the third network.

9. The device of claim 8, where the processor is further to:
determine that the user device is located at a third location, the third location being different than the first location;
determine that at least one first channel, of the one or more first available channels, is not available at the third location;
modify, based on determining that the at least one first channel, of the one or more first available channels, is not available at the third location, the single electronic program guide to remove information regarding the at least one first channel; and
provide, for display, the modified electronic program guide.

10. The device of claim 8, where the processor is further to:
determine that the user device is located at a third location, the third location being different than the first location;
determine that at least one additional channel, associated with the first network or the second network, is available at the third location;
modify, based on determining that the at least one additional channel, associated with the first network or the second network, is available, the single electronic program guide to add information regarding the at least one additional channel; and
provide, for display, the modified electronic program guide.

11. The device of claim 8, where the processor is further to:
determine that the user device is located at a third location, the third location being different than the first location;
determine that at least one network, of the first network or the second network is not available at the third location;
modify, based on determining that the at least one network is not available at the third location, the single electronic program guide,
where, when modifying the single electronic program guide, the processor is further to:
remove at least one of the first network identifier or the second network identifier; and remove at least one of the first set of content identifiers or the second set of content identifiers; and provide, for display, the modified electronic program guide.

12. The device of claim 8, where the first network and the second network include a cellular network and a wireless, non-cellular network.

13. The device of claim 8, where the processor is further to:
receive a request to create the single electronic program guide;
obtain channel information associated with the one or more first available channels and the one or more second available channels, network information associated with each of the first network and the second network, and content information associated with the one or more first available channels and the one or more second available channels; and
create, based on obtaining the channel information, the network information, and the content information, the single electronic program guide.

14. The device of claim 13, where, when obtaining the channel information and the content information, the processor is to:
obtain channel information and content information for each of a plurality of venues, and
where, when creating the single electronic program guide, the processor is further to:
create a respective single electronic program guide for each of the plurality of venues.

15. A non-transitory computer-readable medium for storing instructions, the instructions comprising:
one or more instructions, which, when executed by a processor of a network device, cause the processor to:
generate a single electronic program guide;
receive a request for the single electronic program guide,
the request for the single electronic program guide being received from a user device,
the user device being different than the network device;
determine, at a first time, a first location of the user device,
the first location being associated with a first particular area within a single venue;
determine, based on the determining that the user device is located in the first location, that a first network is available to the user device and that a second network is available to the user device;
receive capability information associated with the user device;
determine, based on determining that the first network is available and that the second network is available and using the capability information, that the first network and the second network are accessible by the user device;
provide, based on determining that the first network and the second network are accessible by the user device, the single electronic program guide for display,
the single electronic program guide including:
a first network identifier for each of one or more first available channels associated with the first network,
a first set of content identifiers associated with the one or more first available channels associated with the first network,
determine, at a second time, a second location of the user device,
the second time being different than the first time, and
the second location being:
different than the first location, and
associated with a second particular area within the single venue,
the second particular area being different than the first particular area;
determine, based on the determining the second location of the user device, that a third network is available to the user device and that a fourth network is not available to the user device;
provide, based on determining that the fourth network is not available to the user device, a notification that one or more available channels, associated with the fourth network, are not viewable by the user device;
determine, based on determining that the third network is available and using the capability information, that the third network is accessible by the user device; and
provide, based on the determining that the user device is located in the second location, another electronic program guide for display,
the other electronic program guide being different than the single electronic program guide, and
the other electronic program guide including:
a third network identifier for each of one or more third available channels associated with the third network,
the one or more third available channels being different than the one or more first available channels and the one or more second available channels, and
a third set of content identifiers associated with the one or more third available channels associated with the third network.

16. The non-transitory computer-readable medium of claim 15, where the one or more instructions are further to cause the processor to:
determine that the user device is located at a third location, the third location being different than the first location;
determine that at least one first channel, of the one or more first available channels, is not available at the third location;
modify, based on determining that the at least one first channel, of the one or more first available channels, is not available at the third location, the single electronic program guide to remove information regarding the at least one first channel; and
provide, for display, the modified electronic program guide.

17. The non-transitory computer-readable medium of claim 15, where the one or more instructions are further to cause the processor to:
determine that the user device is located at a third location, the third location being different than the first location;
determine that at least one additional channel, associated with the first network or the second network, is available at the third location;
modify, based on determining that the at least one additional channel, associated with the first network or the second network, is available, the single electronic program guide to add information regarding the at least one additional channel; and
provide, for display, the modified electronic program guide.

18. The non-transitory computer-readable medium of claim 15, where the one or more instructions are further to cause the processor to:
determine that the user device is located at a third location, the third location being different than the first location;
determine that at least one network, of the first network or the second network, is not available at the third location;
modify, based on determining that the at least one network is not available at the third location, the single electronic program guide,
   where, when modifying the single electronic program guide, the one or more instructions are further to cause the processor to:
      remove at least one of the first network identifier or the second network identifier; and
      remove at least one of the first set of content identifiers or the second set of content identifiers; and
provide, for display, the modified electronic program guide.

19. The non-transitory computer-readable medium of claim 15, where the one or more instructions are further to cause the processor to:

receive a request to create the single electronic program guide;

obtain channel information associated with the one or more first available channels and the one or more second available channels, network information associated with the first network and the second network, and content information associated with the one or more first available channels and the one or more second available channels; and create, based on obtaining the channel information, the network information, and the content information, the single electronic program guide.

20. The non-transitory computer-readable medium of claim 15, where the first network and the second network include a cellular network and a wireless, non-cellular network.

* * * * *